United States Patent
Gomi et al.

(10) Patent No.: US 7,845,734 B2
(45) Date of Patent: Dec. 7, 2010

(54) VEHICLE SEATBELT

(75) Inventors: Seiji Gomi, Tokyo (JP); Jung Jae Yoon, Tokyo (JP)

(73) Assignee: Takata Corporation, Tokyo (JP)

( * ) Notice: Subject to any disclaimer, the term of this patent is extended or adjusted under 35 U.S.C. 154(b) by 292 days.

(21) Appl. No.: 11/992,417

(22) PCT Filed: Oct. 12, 2006

(86) PCT No.: PCT/JP2006/320367

§ 371 (c)(1),
(2), (4) Date: Jun. 13, 2008

(87) PCT Pub. No.: WO2007/052453

PCT Pub. Date: May 10, 2007

(65) Prior Publication Data

US 2009/0273223 A1    Nov. 5, 2009

(30) Foreign Application Priority Data

Oct. 31, 2005    (JP)    ............... 2005-316000

(51) Int. Cl.
*B60R 22/26* (2006.01)
(52) U.S. Cl. .................. 297/481; 280/801.1
(58) Field of Classification Search ............ 297/474, 297/481; 280/801.1
See application file for complete search history.

(56) References Cited

U.S. PATENT DOCUMENTS

| | | | | |
|---|---|---|---|---|
| 2,480,915 A | * | 9/1949 | George | ............ 297/474 |
| 3,230,009 A | * | 1/1966 | Schmidt | ............ 297/475 |
| 3,405,973 A | * | 10/1968 | Connolly | ............ 297/481 |
| 4,210,365 A | * | 7/1980 | Breitschwerdt et al. | ..... 297/481 |
| 4,549,768 A | | 10/1985 | Föhl | |
| 4,560,203 A | * | 12/1985 | Huber | ............ 297/481 |

FOREIGN PATENT DOCUMENTS

| | | |
|---|---|---|
| DE | 80 28 060 UI | 2/1981 |
| JP | U1 54-146522 | 10/1972 |
| JP | U1 54-69526 | 5/1979 |
| JP | 63-25155 | 2/1988 |
| JP | 7-017665 | 3/1995 |
| JP | 8-301069 | 11/1996 |
| JP | 2002-225674 | 8/2002 |
| JP | 2003-080988 | 3/2003 |
| JP | 2005-119433 | 5/2005 |

* cited by examiner

*Primary Examiner*—Joseph F Edell
(74) *Attorney, Agent, or Firm*—Foley & Lardner LLP

(57) ABSTRACT

To provide a vehicle seatbelt capable of suppressing the reduction in the power holding of a buckle webbing, a vehicle seatbelt includes a buckle webbing and a buckle mounted at an end of the buckle webbing. The buckle webbing is provided with a webbing loop portion connected to the buckle. The vehicle seatbelt also includes an elastic holding band for holding the buckle webbing inside the seat by stretching the buckle webbing. In the webbing loop portion a band guide member is mounted. The elastic holding band passes through the band guide member and is routed to wrap around the webbing loop portion.

7 Claims, 5 Drawing Sheets

(a)

*PRIOR ART*

(b)

*PRIOR ART*

(a)

(b)

VEHICLE SEATBELT

TECHNICAL FIELDS

The present invention relates to a vehicle seatbelt mounted on an automobile, etc.

BACKGROUND ART

A conventional vehicle seatbelt has been known in that a circular rubber band is attached on an epidermal surface of a seat and a buckle-webbing withdrawn from the lateral of the seat is inserted into the circular rubber band, so that the drooping down of the buckle is prevented by stretching the buckle-webbing toward the seat surface with the circular rubber band (see Patent Document 1).

Patent Document 1: Japanese Unexamined Patent Application Publication No. 2005-119433 (FIG. 1)

DISCLOSURE OF INVENTION

Problems to be Solved by the Invention

However, in the conventional technique mentioned above, during use of the circular rubber band, the band may become misaligned/lengthened. In this case, the circular rubber band is displaced below the buckle, so that the power of the circular rubber band holding the buckle belt is reduced, resulting in the drooping down of the buckle from the seat.

It is an object of the present invention to provide a vehicle seatbelt capable of suppressing the reduction in the power holding a buckle webbing.

Means for Solving the Problems

In order to achieve the above object, according to a first invention, in a vehicle seatbelt including a buckle webbing arranged on the side of a seat and a buckle mounted at an end of the buckle webbing to be detachably attached to a tongue provided in a tongue webbing, the vehicle seatbelt includes an elastic holding band connected to the seat for holding the buckle webbing inside the seat by stretching the buckle webbing and position fixing means for fixing the position of the elastic holding band relative to the buckle webbing.

In such a vehicle seatbelt, when the buckle webbing is stretched inside the seat by the elastic holding band, the elastic holding band is connected to a predetermined position of the seat so that the buckle is held in an erected state from the seat, for example. At this time, since the position of the elastic holding band relative to the buckle webbing is fixed by the position fixing means, the elastic holding band is suppressed from being displaced downward (oppositely to the buckle). Thereby, even when the elastic holding band is used for a long time, the reduction in the power holding the buckle webbing by the elastic holding band can be suppressed.

According to a second invention, preferably, the buckle webbing is provided with a webbing loop portion formed at an end in a loop shape and connected to the buckle, and the position fixing means includes a band guide member mounted to the webbing loop portion so that the band guide member passes inside and outside the loop of the webbing loop portion, and the elastic holding band passes through the band guide member as well as the elastic holding band is routed to wrap the webbing loop portion therewith from the outside of the loop of the webbing loop portion operatively in associated with the band guide member.

In this case, in a state of the elastic holding band passing through the band guide member, the webbing loop portion is stretched and held inside the seat by the elastic holding band. At this time, in a state of the buckle erected from the seat, for example, even the band guide member is to be displaced downward along the buckle webbing, the band guide member is caught on the root of the webbing loop portion. Hence, the downward movement of the band guide member is restricted, so that along with this, the elastic holding band is also suppressed from being displaced downward.

According to a third invention, preferably, the width of the band guide member is smaller than that of the portion of the buckle webbing other than the webbing loop portion.

By such a configuration, in a state of the buckle erected from the seat, for example, even the band guide member is to be displaced downward along the buckle webbing, the band guide member is caught at a position where the buckle webbing increases in width larger than the band guide member. Therefore, the band guide member can be restricted at a position above the root of the webbing loop portion.

ADVANTAGES

According to the present invention, the reduction in the power holding the buckle belt can be suppressed, so that the drooping down of the buckle from the seat can be suppressed. Thereby, when the seat is slid in the front-back direction, for example, the buckle 5 is difficult to interfere with the adjacent seat.

BEST MODE FOR CARRYING OUT THE INVENTION

Preferred embodiments of a vehicle seatbelt according to the present invention will be described in detail below with reference to the drawings.

FIG. 1 is a perspective view showing an embodiment of the vehicle seatbelt according to the present invention along with a seat. In the drawing, the vehicle seatbelt according to the embodiment may be incorporated in an automobile rear seat. The vehicle seatbelt 1 includes a tongue webbing 2, a tongue 3 provided in the intermediate portion of the tongue webbing 2, a buckle webbing 4, and a buckle 5 mounted at an end of the buckle webbing 4 to be detachably attached to the tongue 3.

The tongue webbing 2 is withdrawn from a retractor (not shown) retractably toward an upper part of a vehicle body, and is further inserted into a through ring 6 so as to turn back toward a lower part of the vehicle body. One end of the tongue webbing 2 is fixed to an anchor plate (not shown) provided on one side of a seat 7. The tongue 3 is provided so that the tongue webbing 2 is inserted to the tongue 3 in the intermediate portion of the tongue webbing 2. The buckle webbing 4 is fixed to an anchor plate 8 provided on the other side of the seat 7.

As shown in FIGS. 2 and 3, at one end of the buckle webbing 4, a loop-shaped webbing loop portion 9 is provided. The webbing loop portion 9 is connected to the buckle 5 in a state hooked on a frame 5a of the buckle 5. In the vicinity of the webbing loop portion 9 of the buckle webbing 4, a pattern stitched portion 10 is provided by stitching overlapping portions together, which are made by folding back the buckle webbing 4 in a loop shape.

In the buckle webbing 4, the width of the webbing loop portion 9 is smaller than the width $W_1$ of the portion of the buckle webbing 4 other than the webbing loop portion 9. Moreover, the width of the webbing loop portion 9 is tapered toward its end (the buckle 5).

Referring back to FIG. 1, in the vicinity of a seat back (back-face portion) 7b in a seat cushion (bearing surface) 7a of the seat 7, a storage recess 11 is formed for accommodating the buckle 5 therein. In the storage recess 11, a rubber elastic holding band 12 is provided for stretching the buckle webbing 4 inside the seat cushion 7a to hold it therein. The elastic holding band 12 may be a string type or a band shape.

As shown in FIGS. 2 and 3, the webbing loop portion 9 of the buckle webbing 4 is provided with a band guide member 13 mounted to be inserted by the elastic holding band 12 thereinto. The band guide member 13 is made from cloth or a resin. The band guide member 13 is formed by being sewn to wrap a branch of the webbing loop portion 9 adjacent to the seat 7 therewith so as to pass inside and outside of the loop. The width $W_2$ of the band guide member 13 is smaller than the width $W_1$ of the portion of the buckle webbing 4 other than the webbing loop portion 9.

The elastic holding band 12 is inserted into the band guide member 13 as well as is routed to wrap the webbing loop portion 9 therewith from the outside of the loop of the webbing loop portion 9 operatively in associated with the band guide member 13.

Specifically, one end of the elastic holding band 12 is connected at a band fixing position provided in the storage recess 11 of the seat 7. In this state, first, the elastic holding band 12 is inserted into the band guide member 13 from the below (the rear anchor of the buckle webbing 4). Then, the elastic holding band 12 is wrapped around the webbing loop portion 9 so that the elastic holding band 12 does not pass inside the loop of the webbing loop portion 9 but passes outside the loop of the webbing loop portion 9.

Incidentally, when the elastic holding band 12 and the band guide member 13 are not provided like in the past, as shown in FIG. 4(a), the buckle 5 is generally accommodated in the storage recess 11 of the seat 7; however, the buckle 5, as shown in FIG. 4(b), may hang down or drop out of the seat 7 due to factors such as vibration. Thus, for suppressing the drooping of the buckle 5, a strap or a rubber band may be attached on the side of the seat 7; however, if the strap becomes misaligned/lengthened so as to be displaced downward during service, for example, the buckle 5 may hang down in the same way. In such a state, when the seat 7 is slid in the front-back direction, for example, the buckle 5 may interfere with the adjacent seat.

Whereas, in the vehicle seatbelt 1 according to the embodiment, the band guide member 13 is mounted on the webbing loop portion 9 of the buckle webbing 4; the elastic holding band 12 connected to the seat 7 is configured to pass through the band guide member 13 and to wrap the webbing loop portion 9 therewith, so that the webbing loop portion 9 is stretched and held inside the seat 7 by the elastic holding band 12. At this time, in the seat 7, for example, by changing the fixed-position of the elastic holding band 12, as shown in FIG. 5(a), the buckle webbing 4 is held in an erected state from the seat cushion 7a; alternatively, as shown in FIG. 5(b), the buckle webbing 4 is held so that the buckle 5 is accommodated within the storage recess 11 of the seat 7.

Since the elastic holding band 12 may become lengthened during service, for example, it may be displaced below (oppositely to the buckle 5). However, the width $W_2$ of the band guide member 13 is smaller than the width $W_1$ of the buckle webbing 4, so that even the band guide member 13 is to be displaced downward along the webbing loop portion 9, the band guide member 13 is caught on the root of the webbing loop portion 9 (see FIG. 3). That is, the downward movement of the band guide member 13 is restricted by the root of the webbing loop portion 9, so that the position of the band guide member 13 relative to the webbing loop portion 9 is fixed.

Thereby, the elastic holding band 12 passing through the band guide member 13 is also suppressed from being displaced downward, so that the position stretching the webbing loop portion 9 by the elastic holding band 12 is fixed. Hence, even when the elastic holding band 12 is used for a long time, the reduction in the power holding the buckle webbing 4 by the elastic holding band 12 is suppressed, so that the drooping down or the dropping out of the buckle 5 can be suppressed. Consequently, it can be suppressed that when the seat 7 is slid in the front-back direction, for example, the buckle 5 interferes with the adjacent seat.

Since the band guide member 13 is mounted on the webbing loop portion 9; the elastic holding band 12 passing through the band guide member 13 is configured to outside wrap the loop of the webbing loop portion 9, when the webbing loop portion 9 is stretched and held inside the seat 7 by the elastic holding band 12, a force can be effectively exerted for putting the buckle 5 down onto the seat 7.

Furthermore, since components for holding the buckle webbing 4 require only very simple ones, such as the rubber elastic holding band 12 and the cloth or resin band guide member 13, the holding structure of the buckle webbing 4 is not of a large scale, but can be achieved in low cost.

The present invention is not limited to the embodiment described above. For example, the width $W_1$ of the buckle webbing 4 may be wholly the same, including the webbing loop portion 9. In this case, another webbing is overlapped on the root of the webbing loop portion 9 and sewn together so as to increase the thickness of that portion. By doing so, even the band guide member 13 is to be displaced downward along the webbing loop portion 9, the band guide member 13 is caught on the root of the webbing loop portion 9.

The vehicle seatbelt 1 according to the embodiment is applied to the rear seat; however, the vehicle seatbelt according to the present invention may be obviously incorporated in a front seat, if possible.

Figure 1:
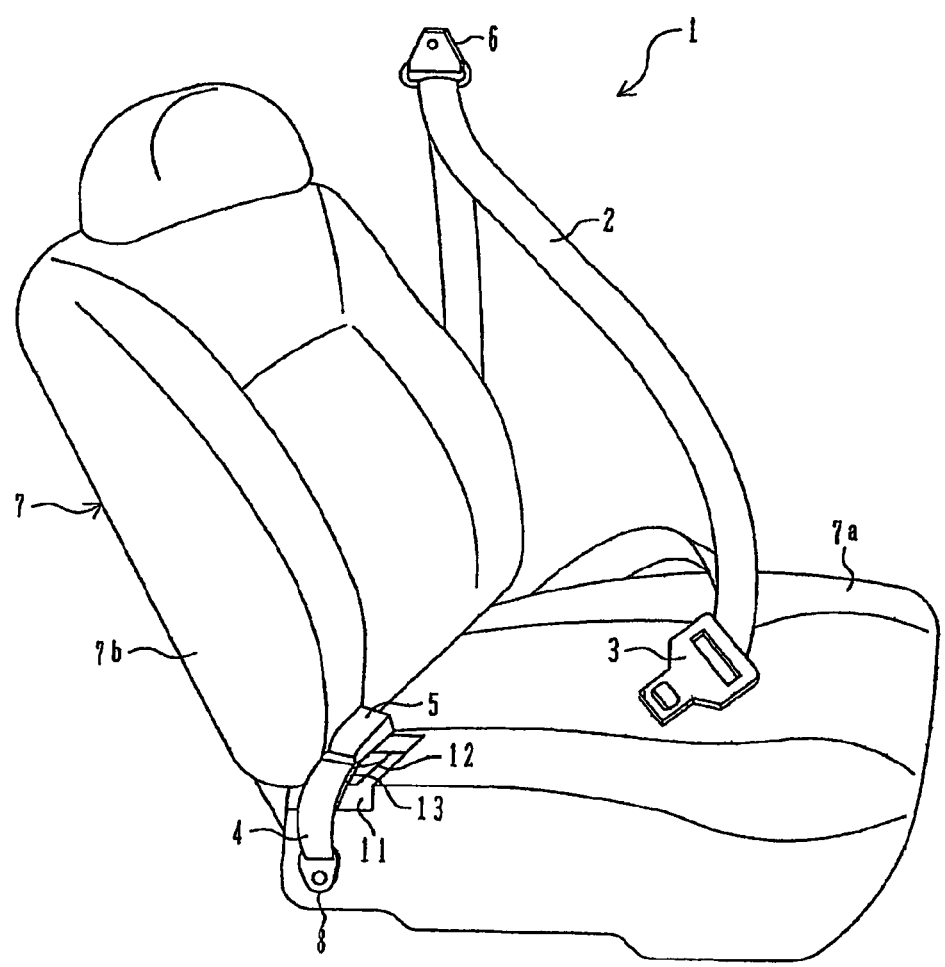
FIG. 1 is a perspective view showing an embodiment of a vehicle seatbelt according to the present invention along with a seat.
Figure 2:
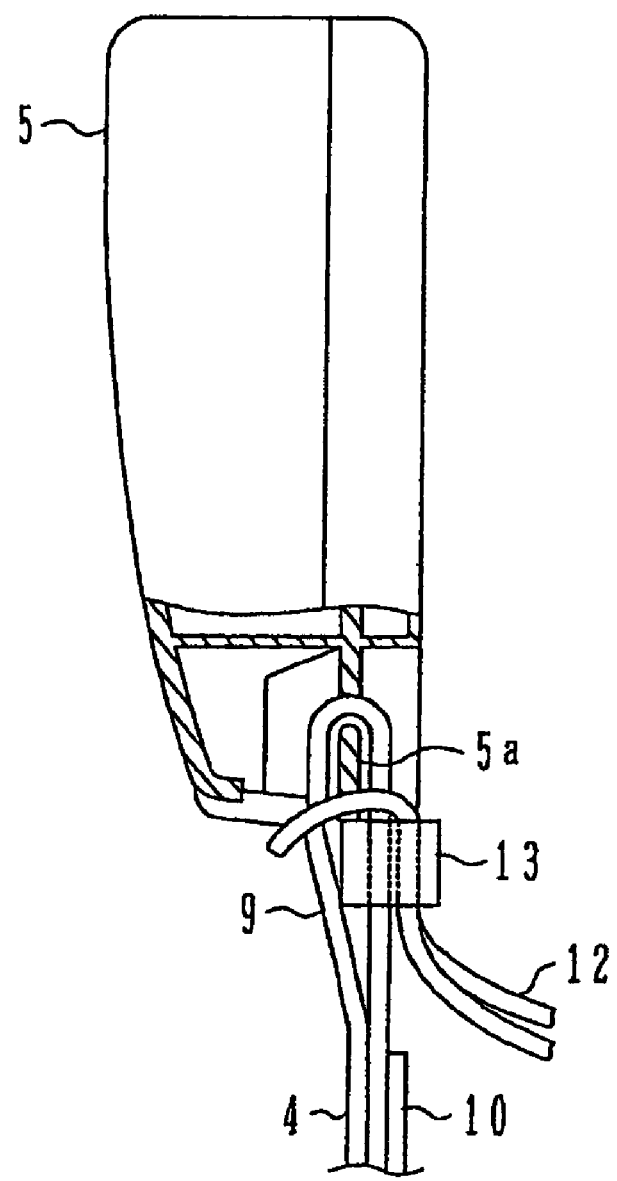
FIG. 2 is a side view (partly including a section) of an essential part of the vehicle seatbelt shown in FIG. 1.
Figure 3:
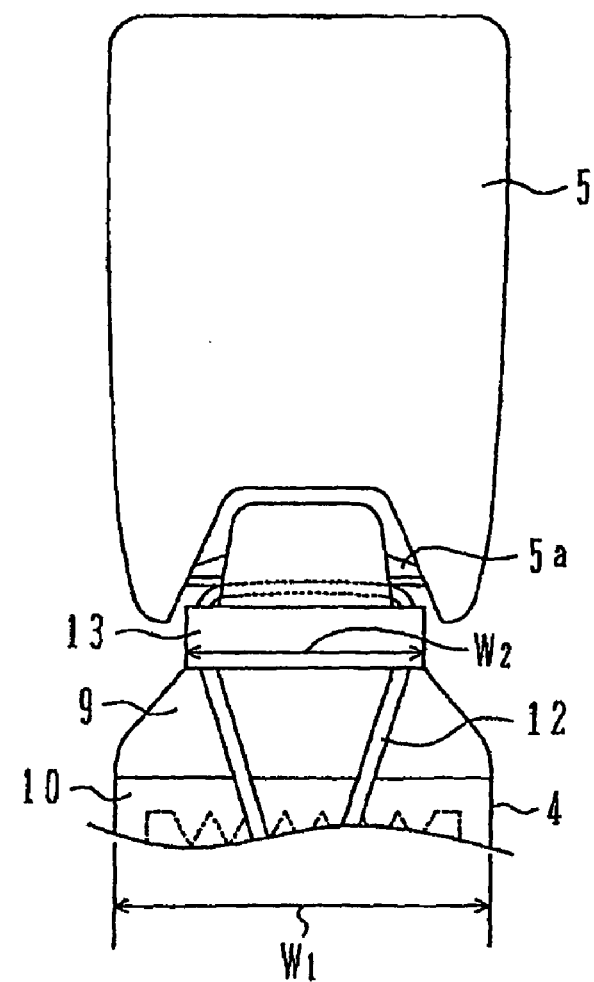
FIG. 3 is a front view of an essential part of the vehicle seatbelt shown in FIG. 1.
Figure 4:
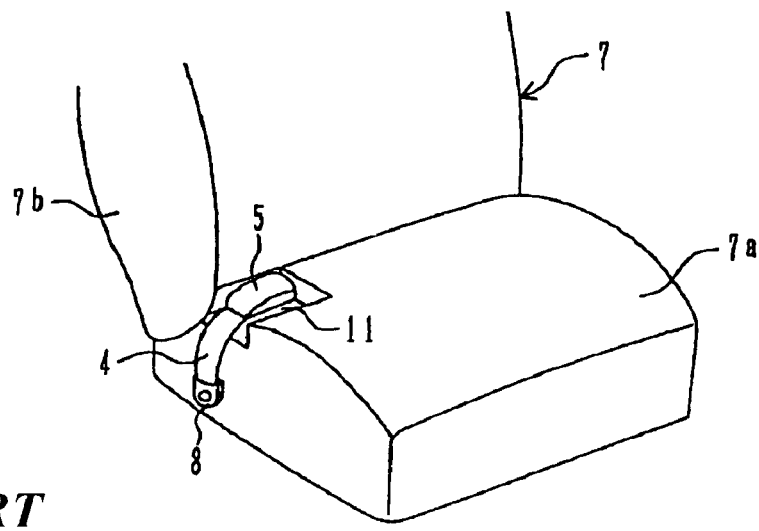
FIG. 4 includes perspective views showing essential parts of a conventional vehicle seatbelt along with a seat.
Figure 4:
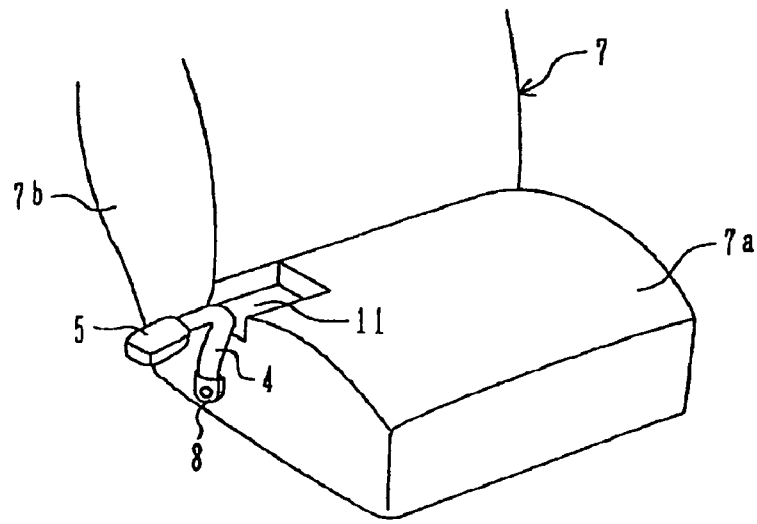
Figure 5:
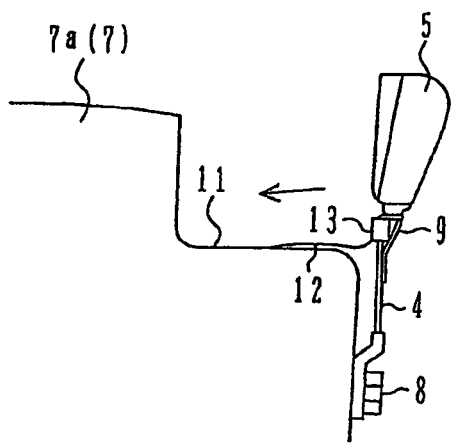
FIG. 5 includes side views showing service conditions of an essential part of the vehicle seatbelt shown in FIG. 1.
Figure 5:
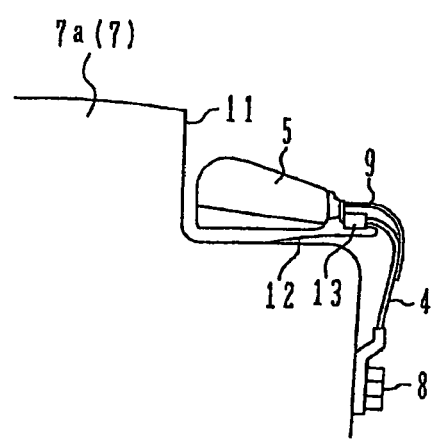

REFERENCE NUMERALS 1 vehicle seatbelt
2 tongue webbing
3 tongue
4 buckle webbing
5 buckle
7 seat
9 webbing loop portion
12 elastic holding band
13 band guide member (position fixing means)

The invention claimed is:
1. A vehicle seatbelt comprising:
a tongue;

a buckle webbing arranged on a the side of a seat, and comprising a webbing loop portion formed at an end thereof, wherein the webbing loop portion comprises a loop;

a buckle mounted at an end of the buckle webbing to be detachably attached to the tongue, wherein the buckle is connected to the buckle webbing via the loop;

an elastic holding band connected to the seat for holding the buckle webbing inside the seat by stretching the buckle webbing; and a band guide member for fixing a position of the elastic holding band relative to the buckle webbing, wherein the elastic holding band passes between an inside of the band guide member and an outside of the webbing loop portion while being wrapped around the outside of the webbing loop portion.

2. The seatbelt according to claim 1, wherein the band guide member passes inside and outside the loop of the webbing loop portion, and wherein the elastic holding band is routed to wrap around the outside of the loop of the webbing loop portion operatively associated with the band guide member.

3. The seatbelt according to claim 1, wherein a width of the band guide member across the webbing loop portion is smaller than a portion of the buckle webbing other than the webbing loop portion.

4. The seatbelt according to claim 1, further comprising a tongue webbing, wherein the tongue is provided on the tongue webbing.

5. The seatbelt according to claim 1, wherein the band guide member is formed by being sewn to wrap a branch of the webbing loop portion adjacent to the seat.

6. The seatbelt according to claim 1, wherein the elastic holding band is a rubber elastic holding band.

7. The seatbelt according to claim 1, wherein the band guide member passes through an inside of the loop and along an outer side of the loop.

* * * * *